United States Patent
Clauss

[19]

[11] Patent Number: 5,869,565
[45] Date of Patent: Feb. 9, 1999

[54] POLYETHER POLYOL AND POLYURETHANE COMPOSITIONS PROTECTED AGAINST OXIDATION AND CORE SCORCHING

[75] Inventor: Margot Clauss, Riedisheim, France

[73] Assignee: Ciba Specialty Chemicals Corporation, Tarrytown, N.Y.

[21] Appl. No.: 643,722

[22] Filed: May 6, 1996

[30] Foreign Application Priority Data

May 12, 1995 [CH] Switzerland ............................. 1393/95

[51] Int. Cl.⁶ ............................. C08J 3/00; C08K 3/20; C08L 75/00
[52] U.S. Cl. ............................. 524/590; 524/86; 524/96; 524/107; 524/108; 524/109; 524/111; 524/115; 524/257; 524/589; 568/587; 568/701
[58] Field of Search ....................... 524/589, 590, 524/96, 86, 107, 108, 111, 115, 109, 257; 568/701, 587

[56] References Cited

U.S. PATENT DOCUMENTS

| | | | |
|---|---|---|---|
| 3,280,049 | 10/1966 | Hyre et al. ............................. | 260/2.5 |
| 4,007,230 | 2/1977 | Hinze ................................. | 260/611.5 |
| 4,021,385 | 5/1977 | Austin et al. ........................... | 260/2.5 |
| 4,070,304 | 1/1978 | Hinze ................................. | 252/404 |
| 4,265,783 | 5/1981 | Hinze ................................. | 252/182 |
| 4,275,173 | 6/1981 | Hinze ................................. | 521/117 |
| 4,611,016 | 9/1986 | Hinsken et al. ......................... | 529/99 |
| 5,175,312 | 12/1992 | Dubs et al. ............................ | 549/307 |
| 5,308,899 | 5/1994 | Michaelis ............................. | 524/109 |
| 5,422,415 | 6/1995 | Michaelis ............................. | 128/85 |

FOREIGN PATENT DOCUMENTS 2281910  3/1995  United Kingdom .

*Primary Examiner*—Patrick D. Niland
*Attorney, Agent, or Firm*—Luther A. R. Hall; David R. Crichton

[57] ABSTRACT

Described are compositions protected against thermal and oxidative degradation, comprising A) a polyether polyol or mixtures of such polyols, B) at least one benzofuranone derivative of formula I

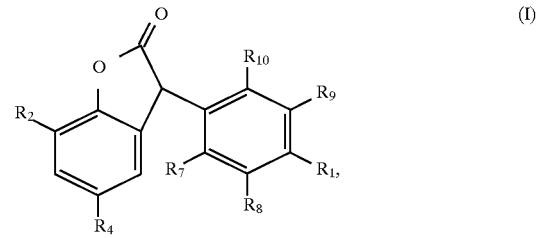

(I)

wherein either two of $R_1$, $R_7$, $R_8$, $R_9$ and $R_{10}$ are each independently of the other $C_1$–$C_4$alkyl or $C_1$–$C_4$alkoxy, the others being hydrogen, or $R_7$ to $R_{10}$ are hydrogen, or at most two of these radicals are each independently of the other methyl or methoxy, and $R_1$ is —O—$CHR_3$—$CHR_5$—O—CO—$R_6$, $R_2$ and $R_4$ are each independently of the other hydrogen or $C_1$–$C_6$alkyl, $R_3$ is hydrogen or $C_1$–$C_4$alkyl, $R_5$ is hydrogen, phenyl or $C_1$–$C_6$alkyl, and $R_6$ is $C_1$–$C_4$alkyl, C) at least one compound from group of the phenolic antioxidants, and/or D) at least one compound from group of the amino antioxidants of the secondary amine type.

Polyurethane and polyurethane foams prepared therefrom are also protected against thermal and oxidative degradation, in particular against discoloration and core scorching.

20 Claims, No Drawings

POLYETHER POLYOL AND POLYURETHANE COMPOSITIONS PROTECTED AGAINST OXIDATION AND CORE SCORCHING

The present invention relates to polyether polyol and polyurethane compositions that are protected in particular against oxidation and against the undesired phenomenon of core scorching in the preparation of polyurethane foam by the presence of at least one benzofuran-2-one derivative and at least one further compound from the group of the phenolic antioxidants and/or from the group of the amino antioxidants of the secondary amine type, as well as to the use of said derivatives and compounds as additives for the prevention of said phenomena, and to a process for the preparation of polyurethane using these derivatives and compounds.

Currently, 2,6-di-tert-butyl-4-methylphenol (butylated hydroxytoluene, BHT) is generally used in practice for the above-mentioned purposes, but the improvements in stabilisation achieved with it are not satisfactory.

Combinations of specific antioxidants have also been proposed, such as mixtures of sterically hindered phenols (see e.g. U.S. Pat. No. 3,280,049, U.S. Pat. No. 4,007,230, U.S. Pat. No. 3,494,880), or mixtures of sterically hindered phenols with specific diphenylamines (see e.g. U.S. Pat. No. 4,070,304, U.S. Pat. No. 4,265,783, U.S. Pat. No. 4,275,173 and U.S. Pat. No. 4,021,385). The stabilisers and/or mixtures of stabilisers proposed in these specifications do not, however, meet the stringent demands made on them in practice.

Benzofuranone derivatives are already known as stabilisers for different organic materials (e.g. U.S. Pat. No. 4,611,016; U.S. Pat. No. 5,175,312). The combination with phenolic and/or amino antioxidants has also been proposed (U.S. Pat. No. 5,308,899 and U.S. Pat. No. 5,422,415). It has been found, however, that pink discoloration of the foam may still occur.

Surprisingly, it has now been found that it is possible to prepare compositions that are very effectively protected against oxidation by adding to polyether polyols a combination of —at least one benzofuran-2-one derivative of a specific group of these compounds with —at least one further antioxidant from the group of the phenolic antioxidants and/or the amino antioxidants of the secondary amine type, from which compositions it is possible to produce polyurethane foams which are not spoilt by core scorching or pink discoloration.

Accordingly, the invention relates to compositions comprising
A) a polyether polyol or mixtures of such polyols,
B) at least one benzofuranone derivative of formula I

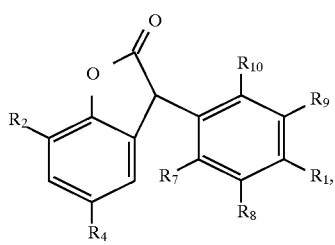

wherein either
two of $R_1$, $R_7$, $R_8$, $R_9$ and $R_{10}$ are each independently of the other $C_1$–$C_4$alkyl or $C_1$–$C_4$alkoxy the others being hydrogen,
or $R_7$ to $R_{10}$ are hydrogen, or at most two of these radicals are each independently of the other methyl or methoxy, and $R_1$ is —O—$CHR_3$—$CHR_5$—O—CO—$R_6$,
$R_2$ and $R_4$ are each independently of the other hydrogen or $C_1$–$C_6$alkyl,
$R_3$ is hydrogen or $C_1$–$C_4$alkyl,
$R_5$ is hydrogen, phenyl or $C_1$–$C_6$alkyl, and
$R_6$ is $C_1$–$C_4$alkyl,
C) at least one compound from group of the phenolic antioxidants, and/or
D) at least one compound from group of the amino antioxidants of the secondary amine type.
In component B):
alkoxy groups are preferably methoxy;
$R_1$ is preferably hydrogen, $C_1$–$C_4$alkyl, in particular methyl, or —O—$CHR_3$—$CHR_5$—O—CO—$R_6$;
$R_7$, $R_8$, $R_9$ and $R_{10}$ are preferably each independently of one another hydrogen, methyl or methoxy;
$R_7$, $R_8$, $R_9$ and $R_{10}$ are preferably each independently of one another hydrogen or methyl and, more preferably, two of $R_1$ and $R_7$ to $R_{10}$ are methyl and are preferably in ortho-position to each other and, very particularly preferably,
either $R_1$ is O—$CH_2CH_2$—O—CO—$CH_3$,
or two of $R_1$ and $R_7$ to $R_{10}$ are methyl, the others being hydrogen, and furthermore $R_2$ and $R_4$ is preferably tert-butyl.
The phenolic component C) corresponds to at least one compound of formula II,

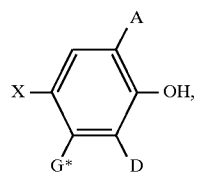

wherein
A is hydrogen, $C_1$–$C_{24}$alkyl, $C_5$–$C_{12}$cycloalkyl, phenyl-$C_1$–$C_4$alkyl, phenyl or a group of formula —$CH_2$—S—$R_{12}$ or

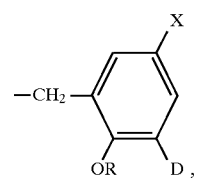

D is $C_1$–$C_{24}$alkyl, $C_5$–$C_{12}$cycloalkyl, phenyl-$C_1$–$C_4$alkyl, phenyl or a —$CH_2$—S—$R_{12}$ group,
X is hydrogen, $C_1$–$C_{18}$alkyl or one of the groups of formula —$C_aH_{2a}$—$S_q$—$R_{13}$, —$C_b$ $H_{2b}$—CO—$OR_{14}$, —$C_bH_{2b}$—CO—N($R_{16}$)($R_{17}$), —$CH_2$N($R_{21}$)($R_{22}$),

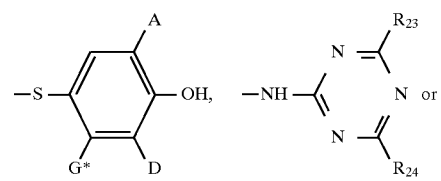

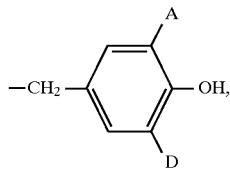

R is hydrogen or a group of formula —CO—CH=CH$_2$,

G* is hydrogen or C$_1$–C$_{12}$alkyl,

R$_{12}$ is C$_1$–C$_{18}$alkyl, phenyl or a group of formula —(CH$_2$)$_c$—CO—OR$_{15}$ or —CH$_2$CH$_2$OR$_{20}$,

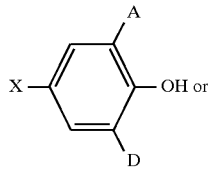

R$_{13}$ is hydrogen, C$_1$–C$_{18}$alkyl, phenyl, benzyl or group of formula

—(CH$_2$)$_c$—CO—OR$_{15}$ or —CH$_2$—CH$_2$—OR$_{20}$,

R$_{14}$ is C$_1$–C$_{30}$alkyl or one of the groups of formulae —CHR$_{18}$—CH$_2$—S—R$_{19}$,

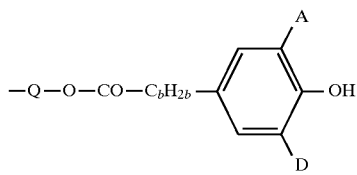

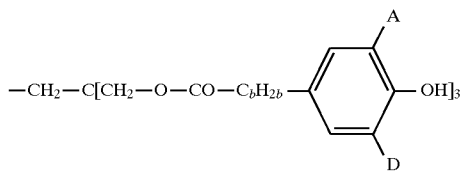

wherein Q is C$_2$–C$_8$alkylene, C$_4$–C$_6$thiaalkylene or a —CH$_2$CH$_2$(OCH$_2$CH$_2$)$_d$— group R$_{15}$ is C$_1$–C$_{24}$alkyl, R$_{16}$ is hydrogen, C$_1$–C$_{18}$alkyl or cyclohexyl, R$_{17}$ is C$_1$–C$_{18}$alkyl, cyclohexyl, phenyl, C$_1$–C$_{18}$alkyl-substituted phenyl or one of the groups of

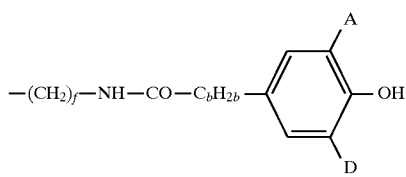

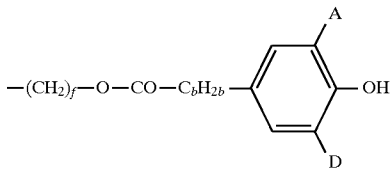

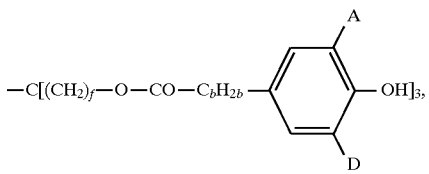

or R$_{16}$ and R$_{17}$ together are C$_4$–C$_8$alkylene which can be interrupted by —O— or —NH—, R$_{18}$ is hydrogen, C$_1$–C$_4$alkyl or phenyl, R$_{19}$ is C$_1$–C$_{18}$alkyl, R$_{20}$ is hydrogen, C$_1$–C$_{24}$alkyl, phenyl, C$_2$–C$_{18}$alkanoyl or benzoyl, R$_{21}$ is C$_1$–C$_{18}$alkyl, cyclohexyl, phenyl, C$_1$–C$_{18}$alkyl-substituted phenyl or a

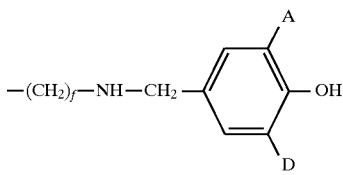

group,

R$_{22}$ is hydrogen, C$_1$–C$_{18}$alkyl, cyclohexyl, or a

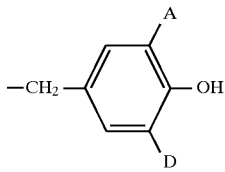

group, or

R$_{21}$ and R$_{22}$ together are C$_4$–C$_8$alkylene which can be interrupted by —O— or —NH—, R$_{23}$ and R$_{24}$ are —S—C$_1$–C$_{18}$alkyl, a is 0, 1, 2 or 3, b is 0, 1, 2 or 3, c is 1 or 2, d is 1 to 5, f is 2 to 8, and q is 1, 2, 3 or 4.

Component C) particularly preferably corresponds to compounds of formula II, wherein A is hydrogen, C$_1$–C$_8$alkyl, cyclohexyl, phenyl or a group of formula —CH$_2$—R$_{23}$ or

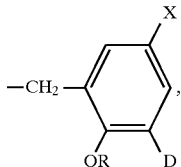

D is C$_1$–C$_8$alkyl, cyclohexyl, phenyl or a —CH$_2$—R$_{24}$ group,

X is hydrogen, C$_{-C_8}$alkyl or one of the groups of formula —C$_a$H$_{2a}$—S$_q$—R$_{13}$, —C$_b$H$_{2b}$CO—OR$_{14}$, —CH$_2$N(R$_{21}$)(R$_{22}$).

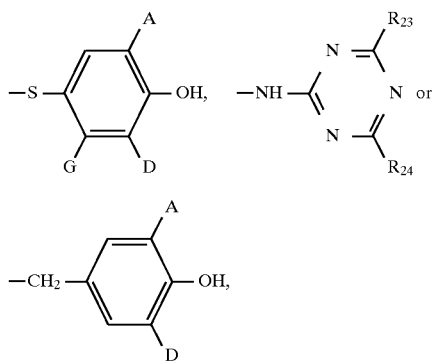

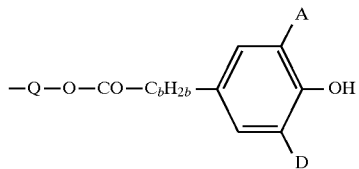

$R_{13}$ is $C_1-C_{12}$alkyl, phenyl or a —$(CH_2)_c$—CO—$OR_{15}$ group, $R_{14}$ is $C_1-C_{18}$alkyl or a

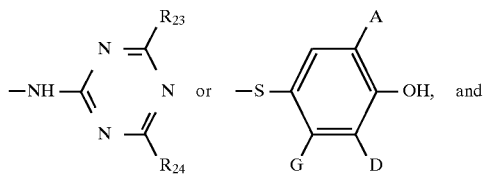

group, wherein Q is $C_2-C_8$alkylene, —$CH_2$—$CH_2$—S—$CH_2CH_2$ or a —$CH_2CH_2(OCH_2CH_2)_d$— group, $R_{15}$ is $C_1-C_{18}$alkyl, $R_{21}$, and $R_{22}$ are each independently of the other hydrogen or $C_1-C_{12}$alkyl, or $R_{21}$ and $R_{22}$ together are $C_4-C_8$alkylene which can be interrupted by —O— or —NH—, a is 1 or 2, b is 1 or 2, c is 1 or 2, and d is 1, 2 or 3, and $R_{23}$ and $R_{24}$ are —S—$C_1-C_{18}$alkyl.

Component C) very particularly preferably corresponds to compounds of formula II, wherein

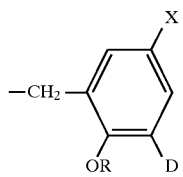

A is hydrogen, $C_1-C_6$alkyl, —$CH_2$—$R_{23}$ or a group,

D is hydrogen or $C_1-C_{18}$alkyl, and

X is hydrogen, $C_1-C_4$alkyl, —$CH_2$—$R_{23}$ or a group of formula

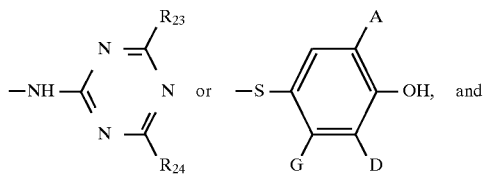

$R_{23}$ and $R_{24}$ are —S—$C_1-C_{18}$alkyl.

Component C) may also be a tocopherol or vitamin E derivative, typically α-tocopherol, β-tocopherol, γ-tocopherol, δ-tocopherol and mixtures thereof. Among these, vitamin E (α-tocopherol) itself is preferred.

Component C) can also be an oligomeric antioxidant of the following type:

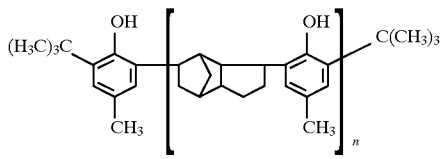

(average molecular weight: 600–700).

The amino component D) preferably corresponds to formula III

(III)

wherein $R_{25}$ is $C_1-C_{18}$alkyl, phenyl-$C_1-C_4$alkyl, $C_5-C_{12}$cycloalkyl, phenyl, naphthyl, or phenyl or naphthyl, each of which is substituted by $C_1-C_{12}$alkyl or $C_1-C_{12}$alkoxy or benzyl or α,α-dimethylbenzyl, $R_{26}$ is phenyl, naphthyl, or phenyl or naphthyl, each of which is substituted by $C_1-C_{12}$alkyl or $C_1-C_{12}$alkoxy or benzyl or α,α-dimethylbenzyl, or $R_{25}$ and $R_{26}$, taken together, form a radical of formula IV

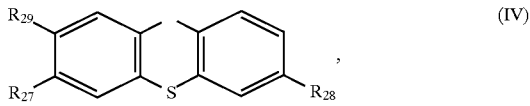

(IV)

wherein $R_{27}$ and $R_{28}$ are hydrogen or $C_1-C_{18}$alkyl, or $R_{28}$ hydrogen or $C_1-C_{18}$alkyl, and $R_{27}$ and $R_{28}$, taken together, form a group of formula

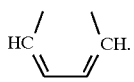

Component D) particularly preferably corresponds to at least one compound of formula III, wherein $R_{25}$ and $R_{26}$ are each independently of the other phenyl or $C_1-C_{12}$alkyl-substituted phenyl or, taken together, form a radical of formula IV.

In formula III, $R_{25}$ and $R_{26}$ very particularly preferably form a radical of formula IV, wherein $R_{27}$ and $R_{28}$ are $C_6-C_{12}$alkyl, and $R_{29}$ is hydrogen, or component D) is a technical mixture obtained by the reaction of diphenylamine with diisobutylene, comprising a) diphenylamine;
b) 4-tert-butyldiphenylamine;
c) compounds of the group
  i) 4-tert-octyldiphenylamine,
  ii) 4,4'-di-tert-butyldiphenylamine,
  iii) 2,4,4'-tris-tert-butyldiphenylamine,
d) compounds of the group
  i) 4-tert-butyl-4'-tert-octyldiphenylamine,
  ii) o,o', m,m', or p,p'-di-tert-octyldiphenylamine,
  iii) 2,4-di-tert-butyl-4'-tert-octyldiphenylamine,
e) compounds of the group
  i) 4,4'-di-tert-octyldiphenylamine, ii) 2,4,-di-tert-octyl-4'-tert-butyldiphenylamine,
and wherein not more than 5% of component a), 8 to 15% of component b), 24 to 32% of component c), 23 to 34% of component d) and 21 to 34% of component e) are present.

Alkyl substituents in the compounds of formulae I, II and III may contain up to 30 carbon atoms. Typical examples of such substituents are methyl, ethyl, propyl, butyl, pentyl, hexyl, octyl, nonyl, decyl, undecyl, dodecyl, tetradecyl, hexadecyl, octadecyl, eicosyl or docosyl and corresponding branched isomers, preferably tert-butyl, i-octyl and i-dodecyl. Alkoxy, alkanedioxy, alkanoyl and alkoxycarbonyl radicals are clearly derived from those groups as are also the alkylene radicals included in the definitions of the substituents indicated in formulae I–III. The cited alkyl radicals and groups derived therefrom may be interrupted by oxygen or sulfur to form, in particular, structural units such as —$CH_2CH_2$—O—$CH_2CH_2$—, —$CH_2CH_2$—S—$CH_2CH_2$— or —O—$(CH_2)_6$—O—.

Alkenyl radicals are derived from alkyl radicals by the replacement of one or more than one C—C single bond by C=C double bonds. Allyl and isoallyl are preferred. Alkenyloxy is derived from alkenyl by adding —O—.

$C_5$–$C_{12}$cycloalkyl radicals typically include cyclopentyl, cyclohexyl, cycloheptyl, cyclooctyl, cyclodecyl and cyclododecyl. Cyclopentyl, cyclohexyl and cycloheptyl are preferred and cyclohexyl is particularly preferred. Cycloalkoxy radicals and cycloalkoxycarbonyl radicals are derived from said $C_5$–$C_{12}$cycloalkyl radicals by adding —CO— or —O—CO— groups. Phenyl-$C_{1-4}$alkyl and $C_7$–$C_9$phenylalkyl are typically benzyl, phenethyl, 3-phenylpropyl, α-methylbenzyl and α,α-dimethylbenzyl. Benzyl is preferred.

The polyethers comprising at least two, generally two to eight, preferably two or three, hydroxyl groups that are suitable as component A) are of the type known per se and are typically prepared by polymerisation of epoxides, such as ethylene oxide, propylene oxide, butylene oxide, tetrahydrofuran, styrene oxide or epichlorohydrin, with themselves, e.g. in the presence of $BF_3$, or by addition of those epoxides, optionally as a mixture or one after another, to starting components having reactive hydrogen atoms, such as water, alcohols, ammonia or amines, typically ethylene glycol, propylene glycol-(1,3) and propylene glycol-(1,2), trimethylolpropane, 4,4'-dihydroxydiphenylpropane, aniline, ethanolamine or ethylenediamine. According to this invention sucrose polyethers are also suitable. Often those polyethers are preferred which have mainly "primary", i.e. $CH_2$ bonded, OH groups (up to 90% by weight, based on all the OH groups present in the polyether). Also suitable are polyethers modified by vinyl polymers, such as those formed, for example, by polymerisation of styrene and acrylonitrile in the presence of polyethers, and also polybutadienes comprising OH groups.

These compounds generally have molecular weights of 400 to 10 000. They are polyhydroxyl compounds, preferably compounds containing 2 to 8 hydroxyl groups, in particular those having a molecular weight of 800 to 10 000, preferably of 1000 to 6000, typically polyethers having at least two, generally 2 to 8, but preferably 2 to 4, hydroxyl groups, such as are known for the preparation of homogeneous and of cellular polyurethanes.

It is, of course, possible to use mixtures of the abovementioned compounds comprising at least two hydrogen atoms that are reactive towards isocyanates, preferably those having a molecular weight of 400 to 10 000.

The compositions of this invention are used especially in the preparation of polyurethane, preferably in the preparation of soft polyurethane foams. The novel compositions and the products prepared therefrom are effectively protected against degradation. In particular, core scorching is avoided during foam preparation. In this connection the invention also relates to the use of the combination of component B) with component C) and/or component D) for the stabilisation of polyether polyols and/or soft polyurethane foams prepared therefrom, as well as to a process for the preparation of polyurethanes which process comprises reacting a polyether polyol, stabilised by the addition of component B) in combination with component C) and/or D), with a polyisocyanate, and also to the polyurethane and the soft polyurethane foam obtained by this process as well as to the polyurethane comprising the components B,C and/or D defined at the outset.

Polyisocyanates suitable for use in this process are aliphatic, cycloaliphatic, araliphatic, aromatic and heterocyclic polyisocyanates, typically ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3-diisocyanate and cyclohexane-1,4-diisocyanate and any mixture of these isomers, 1-isocyanato-3,3,5-trimethyl-5-isocyanatomethylcyclohexane, 2,4- and 2,6-hexahydrotolylene diisocyanate and any mixture of these isomers, hexahydro-1,3- and/or hexahydro-1,4-phenylene diisocyanate, perhydro-2,4'-and/or perhydro-4,4'-diphenylmethane diisocyanate, 1,3- and 1,4-phenylene diisocyanate, 2,4- and 2,6-tolylene diisocyanate and any mixture of these isomers, diphenylmethane-2,4'-and/or diphenylmethane-4,4'-diisocyanate, naphthylene-1, 5-diisocyanate, triphenyl-methane-4,4',4"-triisocyanate, polyphenylpolymethylene polyisocyanates, such as those obtained by aniline/formaldehyde condensation and subsequent phosgenation, m- and p-isocyanatophenylsulfonyl isocyanates, perchlorinated arylpolyisocyanates, polyisocyanates comprising carbodiimide groups, polyisocyanates comprising allophanate groups, polyisocyanates comprising isocyanurate groups, polyisocyanates comprising urethane groups, polyisocyanates comprising acylated urea groups, polyisocyanates comprising biuret groups, polyisocyanates comprising ester groups, reaction products of the abovementioned isocyanates with acetals, and polyisocyanates comprising polymeric fatty acid radicals.

It is also possible to use the distillation residues comprising isocyanate groups that are obtained in the course of the industrial production of isocyanates, optionally dissolved in one or more than one of the above-mentioned polyisocyanates. It is also possible to use any mixture of the above-mentioned polyisocyanates.

Special preference is generally given to polyisocyanates that are technically readily available, typically 2,4- and 2,6-tolylene diosocyanate and any mixture of these isomers (TDI), polyphenylpolymethylene polyisocyanates, such as those obtained by aniline/ formaldehyde condensation and subsequent phosgenation (crude MDI), and polyisocyanates comprising carbodiimide groups, urethane groups, allophanate groups, isocyanurate groups, urea groups or biuret groups (modified polyisocyanates).

The compounds of formula (I) can be prepared in known manner. A detailed description of their preparation is given in DE-A-44 32 732 (GB-A-2 281 910) and EP-A-591 102.

The phenolic and amino antioxidants are either commercially available or can be prepared according to known processes.

In the polyol compositions of this invention, components B), C) and D) together are conveniently present in an amount of 0.01 to 10, typically of 0.05 to 5, preferably of 0.05 to 3, but in particular of 0.1 to 2%, by weight. The ratios by weight of B:C, B:D and B:C:D can vary within wide limits. The ratios of B:C and B:D are conveniently from 10:1 to 1:10, preferably from 5:1 to 1:5. The ratio of B:C:D is conveniently within the range of 10:1:1, 1:1:10 and 1:10:1, e.g. 5:1:1 (1:5:1, 1:1:5) or 2:1:1 (1:2:1, 1:1:2). It may also be advantageous to use these three components in approximately equimolar amounts.

It may also be advantageous to use phosphites in addition to components B), C) and D). Typical examples thereof can be found in the following list. Among these, the following hindered phenol groups-containing phosphites are preferred: triphenyl phosphite, diphenylalkyl phosphites, phenyldialkyl phosphites, tris(nonylphenyl)phoshite, trilaurylphosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bis-isodecyloxypentaerythritol diphosphite, bis(2,4-di-tert-butyl-6-methyl-phenyl)pentaerythritol diphosphite, bis(2,4,6-tri-tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocin, 6-fluoro-2,4,8,10-tetra-tert-butyl-12-methyldibenz[d,g]-1,3,2-dioxaphosphocin, bis(2,4-di-tert-butyl-6-methylphenyl)methyl phosphite, bis(2,4-di-tert-butyl-6-methyl-phenyl)ethyl phosphite.

The novel polyol compositions are preferably used for the preparation of polyurethanes, in particular of polyurethane foams, conveniently using propellants.

In the preparation of polyurethanes it is therefore possible to further add as propellant water and/or readily volatile organic substances. Suitable organic propellants are typically acetone, ethyl acetate, halo-substituted alkanes, such as methylene chloride, chloroform, ethylidene chloride, vinylidene chloride, monofluorotrichloromethane, chlorodifluoromethane, dichlorodifluoromethane, and also butane, hexane, heptane or diethyl ether. A propellant action can also be achieved by adding compounds that decompose at temperatures above room temperature, splitting off gases such as nitrogen, typically azo compounds such as azoisobutyronitrile.

The novel process for the preparation of polyurethanes is conveniently carried out in the presence of suitable catalysts. The catalysts used are known catalysts, typically tertiary amines, such as triethylamine, tributylamine, N-methylmorpholine, N-ethylmorpholine, N-cocomorpholine, N,N,N',N'-tetramethylethylenediamine, 1,4-diazabicyclo-(2,2,2)-octane, N-methyl-N'-dimethylaminoethylpiperazine, N,N-dimethylbenzylamine, bis(N,N-diethylaminoethyl)adipate, N,N-diethylbenzylamine, pentamethyldiethylenetriamine, N,N-dimethylcyclohexylamine, N,N,N',N'-tetramethyl-1,3-butanediamine, N,N-dimethyl-γ-phenylethylamine, 1,2-dimethylimidazole and 2-methylimidazole, and also known Mannich bases formed from secondary amines, such as dimethylamine, and aldehydes, preferably formaldehyde, or ketones, such as acetone, methyl ethyl ketone or cyclohexanone, and phenols, such as phenol, nonylphenol or bisphenol.

Typical examples of tertiary amines comprising hydrogen atoms active towards isocyanate groups and which may be used as catalysts are e.g. triethanolamine, triisopropanolamine, N-methyldiethanolamine, N-ethyldiethanolamine, N,N-dimethylethanolamine, as well as reaction products thereof with alkylene oxides, such as propylene oxide and/or ethylene oxide.

Further suitable catalysts are also silaamines having carbon/silicone bonds, typically 2,2,4-trimethyl-2-silamorpholine and 1,3-diethylaminomethyltetramethyldisiloxane, and nitrogen-containing bases, typically tetraalkylammonium hydroxides, and alkali metal hydroxides, such as sodium hydroxide, alkali metal phenolates, typically sodium phenolate, or alkali metal alcoholates, typically sodium methoxide, or hexahydrotriazines, and also organometallic compounds, in particular organotin compounds, typically tin(II) salts of carboxylic acid, such as tin(II)acetate, tin(II)octoate, tin(II) ethylhexoate and tin(II)laurate, and the tin(IV) compounds, typically dibutyltin oxide, dibutyltin dichloride, dibutyltin diacetate, dibutyltin dilaurate, dibutyltin maleate or dioctyltin diacetate. All of the above-mentioned catalysts can, as a matter of course, be used in the form of mixtures.

Other known additives, for example surface-active additives, such as emulsifiers and foam stabilisers, are optionally also present.

Illustrative examples of suitable emulsifiers are the sodium salts of ricinoleic sulfonates or salts of fatty acids with amines, such as diethylamine oleate or diethanolamine stearate.

Other surface-active additives that may be used are alkali metal salts or ammonium salts of sulfonic acids, for example of dodecylbenzenesulfonic acid or dinaphthylmethanedisulfonic acid, or of fatty acids, such as ricinoleic acid, or of polymeric fatty acids.

Suitable foam stabilisers are primarily polyether siloxanes, in particular water-soluble representatives thereof. The structure of those compounds is generally such that a copolymer of ethylene oxide and propylene oxide is bonded to a polydimethylsiloxane radical.

Further additives that may also be present in the compositions are reaction retardants, typically substances with an acid reaction, such as hydrochloric acid or organic acid halides, and also cell regulators of the type known per se, such as paraffins or fatty alcohols, or dimethylpolysiloxanes and pigments or dyes and flame retardants of the type known per se, typically trichloroethyl phosphate, tricresyl phosphate or ammonium phosphate and ammonium polyphosphate, as well as stabilisers that counteract the effects of ageing and weathering, plasticisers and fungistats and bacteriostats, as well as fillers, such as barium sulfate, diatomaceous earth, carbon black or prepared chalk.

Further examples of surface-active additives and foam stabilisers as well as cell regulators, reaction retardants, stabilisers, flame retardants, plasticisers, dyes and fillers and also fungistats and bacteriostats that are optionally present as well as details of the method of use and mode of action of these additives are well known to a person skilled in the art.

Using the process of this invention, it is possible to prepare polyurethane substances in any form, such as articles of any form as well as fibres. However, the preparation of foams is preferred and it is possible, by suitable selection of the components, to obtain either flexible or rigid foams or any products between those extremes.

Polyurethane foams are preferably prepared from liquid starting components, either the starting materials to be reacted with one another being mixed together in a one-shot process, or a preadduct containing NCO groups that is formed from a polyol and an excess of polyisocyanate being prepared first and then foamed, typically by reaction with water.

According to the invention, the reaction components are reacted in accordance with the known one-shot process, prepolymer process or semi-prepolymer process, often using mechanical devices that are well known to a person skilled in the art.

In the preparation of foams, the foaming is often carried out in moulds. In that case, the reaction mixture is placed in a mould. Suitable mould materials are metals, typically aluminium, or plastics, typically epoxy resin. In the mould, the foamable reaction mixture foams up and forms the moulded article. The foam moulding can be carried out such that the moulding has a cellular surface structure or, alternatively, such that the moulding has a dense skin and a cellular core. In this connection, it is possible to place into the mould a sufficient amount of foamable reaction mixture for the foam obtained to fill the mould exactly. It is, however, also possible to place more foamable reaction mixture into the mould than is required to fill the interior of the mould with foam. In the latter case, therefore, the operation is carried out with overcharging.

In the case of foam moulding, known external release agents, typically silicone oils, are often used concomitantly. It is, however, also possible to use so-called internal release agents, optionally in admixture with external release agents.

According to this invention it is also possible to use cold-curing foams. The foams can, of course, alternatively be prepared by block foaming or by the known double conveyor belt process.

The process according of this invention can be used to prepare flexible, semi-flexible or hard polyurethane foams. The foams find the utilities known for such products, for example as mattresses and upholstery in the furniture and automobile industries, as well as for the manufacture of fittings, such as are used in the automobile industry, and finally as sound-insulating compositions and as compositions for heat-insulation and low-temperature insulation, for example in the construction sector or in the refrigeration industry, or in the textile industry, for example as shoulder pads.

The following Examples further illustrate the invention without, however, limiting it in any way. Here as well as in the remainder of the description, parts and percentages are by weight, unless otherwise stated.

The components of the stabiliser mixtures used are listed below together with their abbreviations:

BF-1: mixtures consisting of c. 5 parts of:

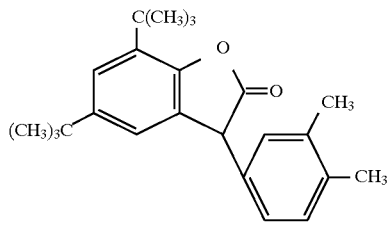

and c. 1 part of:

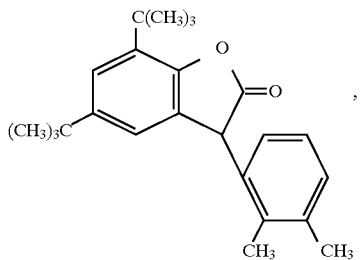

prepared in accordance with DE-A-44 32 732, Example 103;

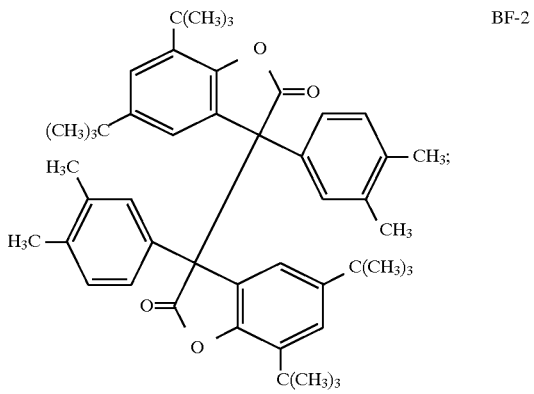

BF-2

A-1, Irganox® 5057: technical mixture, obtained by reaction of diphenylamine with diisobutylene, comprising
  a) 3% of diphenylamine;
  b) 14% of 4-tert-butyldiphenylamine;
  c) 30% of compounds of the group
    i) 4-tert-octyldiphenylamine,
    ii) 4,4'-di-tert-butyldiphenylamine,
    iii) 2,4,4'-tris-tert-butyldiphenylamine,
  d) 29% of the compounds of the group
    i) 4-tert-butyl-4'-tert-octyldiphenylamine,
    ii) o,o', m,m', or p,p'-di-tert-octyldiphenylamine,
    iii) 2,4-di-tert-butyl-4'-tert-octyldiphenylamine,
  e) 24% of the compounds of the group
    i) 4,4'-di-tert-octyldiphenylamine (18%),
    ii) 2,4,-di-tert-octyl-4'-tert-butyldiphenylamine (6%), P-1, Irganox® 1135:

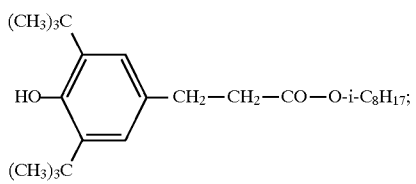

P-2, Irganox® 415:

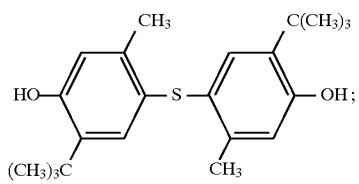

P-3:

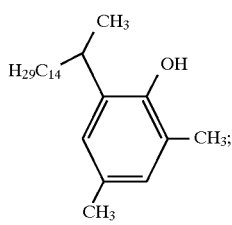

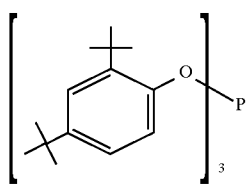

P-4, Wingstay® L:

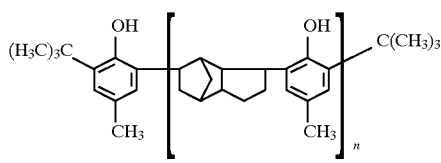

(average molecular weight: 600–700);

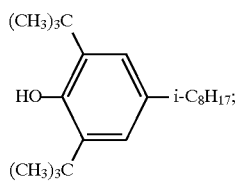

P-5, ISONOX ® 232:
P-6, Irganox® 1076: octadecyl-3-(3,5-di-tert-butyl-4-hydroxyphenyl)propionate;
P-7, Irganox® 1010: pentaerythritoltetrakis-[3-(3, 5-di-tert-butyl-4-hydroxyphenyl)propionate];

P-8, vitamin E: cf. Merck Index 10th Ed., 9832.

Example 1

(Preparation of polyether/polyurethane soft foams as well as the stabilisation thereof)

Exactly 470 mg (0.3%, based on the polyol) of a stabiliser mixture of this invention (see numbered Examples, Tables 1 to 4) are dissolved in 157 g of an antioxidant-free polyether/polyol, ®Lupranol 2045 (trifunctional polyether/polyol having primary hydroxyl groups; hydroxyl number 35 mg KOH/g, water content less than 0.1%, acid number less than 0.1 mg KOH/g). (Polyol batch A will be taken to mean the same above-described polyol as polyol batch B. Types A and B only differ in their storage time.)

10.24 g of a solution consisting of 1.74 g ®TECOSTAB [polysilicone supplied by Goldschmidt, DE], 0.48 g diazabicyclooctane [amine catalyst] and 0.8 g of water are added and the reaction mixture is stirred vigorously at 100 rpm for 60 seconds. 3.2 g of a solution of 0.32 g of tin octoate (catalyst) in 2.9 g of the above polyol are added and the reaction mixture is again stirred vigorously for 60 sec. at 100 rpm. With vigorous stirring, 98 g of an isocyanate (®LupranatT80, supplied by BASF; toluylene-2,4- and toluylene-2,6-diisocyanate mixture) are then added immediately and after 6 sec. the mixture is poured into a lined mould and the exothermic temperature is measured during foaming to a foam block.

The foam blocks are cooled for 24 hours in a climatic chamber at 5° C. and stored. 2 cm slices are sawed from the center of the blocks and round (cylindrical) test samples are cut therefrom using a boring tool. The samples are aged in a test tube in the presence of air at 170°, 180°, 190°, 200°, 210° and 220° C. for 30 minutes in a preheated alu-block thermostat (dynamic heat test).

The yellowing of these samples is determined as yellowness index (YI) according to ASTMD-1925.

The results (Examples 2 to 31) are summarised in the following Tables 1 to 4. The novel stabiliser combinations have an effect over the Examples 3, 11, 17, 18, 22 and 23 of the prior art: Yellowing remains low for a long time (low yellowness index values denote a low degree of yellowing).

TABLE 1

Yellowness index after dynamic alu-block test:
Results with mixtures of phenolic antioxidants and a
lactone in the polyol batch A

| Ex. No. | Stabiliser mixture | Concentr. in %, based on poyol | YI after 30 minutes of dynamic heat test at x° C. | | | | | | |
|---|---|---|---|---|---|---|---|---|---|
| | | | RT | 170 | 180 | 190 | 200 | 210 | 220 |
| 1 | control | — | −2.1 | 40 | 45 | 55 | 70 | 80 | |
| 2 | BHT | 0.24 | −3.6 | −1.9 | 3.5 | 21 | 38 | 77 | |
| | A-1 | 0.06 | | | | | | | |
| 3 | P-1 | 0.24 | −3.8 | −2.1 | 4.6 | 13 | 31 | 65 | |
| | A-1 | 0.06 | | | | | | | |
| 4 | P-2 | 0.24 | −3.1 | −2.2 | −2.0 | −1.6 | 0.9 | 12 | 64 |
| | BF-1 | 0.06 | | | | | | | |
| 5 | P-3 | 0.24 | −2.8 | −2.6 | −1.9 | −1.3 | 1.1 | 22 | 68 |
| | BF-1 | 0.06 | | | | | | | |
| 6 | P-4 | 024 | −3.1 | −2.7 | 0.2 | 0.2 | 1.3 | 30 | 88 |
| | BF-1 | 0.06 | | | | | | | |
| 7 | BF-1 | 0.24 | −2.9 | −2.4 | −1.9 | −1.6 | 0.1 | 24 | 79 |
| | | 0.06 | | | | | | | |
| 8 | P-1 | 0.15 | −3.5 | −2.6 | −2.2 | −1.1 | −0.5 | 6 | 65 |
| | BF-1 | 0.15 | | | | | | | |

TABLE 1-continued

Yellowness index after dynamic alu-block test:
Results with mixtures of phenolic antioxidants and a
lactone in the polyol batch A

| Ex. No. | Stabiliser mixture | Concentr. in %, based on poyol | \multicolumn{7}{c}{YI after 30 minutes of dynamic heat test at x° C.} | | | | | | |
|---|---|---|---|---|---|---|---|---|---|
| | | | RT | 170 | 180 | 190 | 200 | 210 | 220 |
| 9 | P-5 | 0.24 | −3.1 | −2.2 | −1.4 | −0.9 | 0.2 | 46 | 80 |
|   | BF-1 | 0.06 | | | | | | | |
| 10 | P-8 | 0.24 | −3.2 | −2.7 | −1.3 | −0.8 | 5.1 | 25 | 56 |
|   | BF-1 | 0.06 | | | | | | | |

TABLE 2

Yellowness index after dynamic alu-block test:
Results with mixtures of phenolic antioxidants and a
actone in the polyol batch B

| Ex. No. | Stabiliser mixture | Concentr. in %, based on poyol | \multicolumn{7}{c}{YI after 30 minutes of dynamic heat test at x° C.} | | | | | | |
|---|---|---|---|---|---|---|---|---|---|
| | | | 0 | 170 | 180 | 190 | 200 | 210 | 220 |
| 11 | P-1 | 0.24 | −1.3 | 1 | 2.1 | 8.9 | 21 | 46 | 74 |
|   | A-1 | 0.06 | | | | | | | |
| 12 | P-6 | 0.14 | −1.6 | −1 | −0.4 | 0.9 | 2.6 | 30 | 62 |
|   | BF-1 | 0.15 | | | | | | | |
| 13 | P-1 | 0.14 | −1.5 | −1.4 | −0.8 | −0.4 | 4.2 | 22 | 62 |
|   | BF-1 | 0.15 | | | | | | | |
| 14 | P-7 | 0.14 | −1.9 | −1.6 | −0.7 | 0.5 | 7.4 | 36 | 54 |
|   | BF-1 | 0.15 | | | | | | | |
| 15 | P-4 | 0.14 | −1.3 | −1.5 | −0.5 | 0.3 | 15.2 | 28 | 58 |
|   | BF-1 | 0.15 | | | | | | | |
| 16 | P-3 | 0.14 | −1.6 | −1.6 | −0.8 | −0.4 | 6.1 | 32 | 63 |
|   | BF-1 | 0.15 | | | | | | | |

TABLE 3

Yellowness index after alu-block test:
Results with mixtures of amines and lactones in the polyol batch B

| Ex. No. | Stabiliser mixture | Concentr. in %, based on poyol | \multicolumn{7}{c}{YI after 30 minutes of dynamic heat test at x° C.} | | | | | | |
|---|---|---|---|---|---|---|---|---|---|
| | | | 0 | 170 | 180 | 190 | 200 | 210 | 220 |
| 17 | BHT | 0.24 | −2.2 | −2.2 | −1.0 | 6.1 | 16.6 | 49 | 67 |
|   | A-1 | 0.06 | | | | | | | |
| 18 | P-1 | 0.24 | −2.3 | −1.4 | −0.3 | 7.3 | 16.0 | 42 | 69 |
|   | A-1 | 0.06 | | | | | | | |
| 19 | A-1 | 0.24 | −2.0 | −2.5 | −2.0 | −0.7 | 5.8 | 27 | 56 |
|   | BF-1 | 0.06 | | | | | | | |
| 20 | A-1 | 0.225 | −2.1 | −2.1 | −1.8 | −1.6 | 3.9 | 24 | 47 |
|   | BF-1 | 0.075 | | | | | | | |
| 21 | A-1 | 0.14 | −1.4 | −0.8 | −0.7 | 0.2 | 2.9 | 21 | 45 |
|   | BF-1 | 0.15 | | | | | | | |

TABLE 4

Yellowness index after alu-block test:
Results with mixtures of phenolic antioxidants, amines and lactones in the polyol batch B

| Ex. No. | Concentr. in %, based on poyol | Stabiliser mixture | \multicolumn{7}{c}{YI after 30 minutes of dynamic heat test at x° C.} | | | | | | |
|---|---|---|---|---|---|---|---|---|---|
| | | | 0 | 170 | 180 | 190 | 200 | 210 | 220 |
| 22 | 0.24 | BHT | −1.7 | −1.9 | −0.2 | 5.4 | 21 | 49 | 72 |
|  | 0.06 | A-1 | | | | | | | |
| 23 | 0.24 | P-1 | −1.6 | −1.7 | 1.i | 6.6 | 21 | 48 | 69 |
|  | 0.06 | A-1 | | | | | | | |
| 24 | 0.10 | P-1 | −1.6 | −1.7 | −i.2 | −0.7 | 4.9 | 23 | 43 |
|  | 0.15 | A-1 | | | | | | | |
|  | 0.05 | BF-1 | | | | | | | |
| 25 | 0.05 | P-1 | −1.6 | −1.8 | −1.6 | −0.5 | 2.3 | 22 | 51 |
|  | 0.20 | A-1 | | | | | | | |
|  | 0.05 | BF-1 | | | | | | | |
| 26 | 0.08 | P-1 | −1.7 | −2.1 | −1.8 | −1.3 | 5.0 | 26 | 54 |
|  | 0.12 | A-1 | | | | | | | |
|  | 0.04 | BF-1 | | | | | | | |
| 27 | 0.04 | P-1 | −1.4 | −1.3 | −1.4 | −1.3 | 6.8 | 27 | 49 |
|  | 0.16 | A-1 | | | | | | | |
|  | 0.04 | BF-1 | | | | | | | |
| 28 | 0.06 | P-1 | −1.8 | −2.2 | −2.4 | −1.1 | 7.3 | 30 | 56 |
|  | 0.09 | A-1 | | | | | | | |
|  | 0.03 | BF-1 | | | | | | | |
| 29 | 0.03 | P-1 | −1.8 | −1.6 | −2.0 | −1.8 | 8.2 | 34 | 56 |
|  | 0.12 | A-1 | | | | | | | |
|  | 0.03 | BF-1 | | | | | | | |
| 30 | 0.12 | P-1 | −1.9 | −1.8 | −2.2 | −1.4 | 5.1 | 26 | 49 |
|  | 0.08 | A-1 | | | | | | | |
|  | 0.04 | BF-1 | | | | | | | |
| 31 | 0.08 | p-3 | −1.9 | −1.2 | −1.6 | 0.2 | 11.6 | 30 | 53 |
|  | 0.12 | A-1 | | | | | | | |
|  | 0.04 | BF-1 | | | | | | | |

TABLE 5

Yellowness index after alu-block test;
Results with mixtures of amines and lactones in the polyol batch C

| Ex. No. | Stabiliser mixture | Concentr. in %, based on poyol | \multicolumn{7}{c}{YI after 30 minutes of dynamic heat test at x° C.} | | | | | | |
|---|---|---|---|---|---|---|---|---|---|
| | | | 0 | 170 | 180 | 190 | 200 | 210 | 220 |
| 39 | P-1 | 0.10 | −1.6 | −1.5 | −2.1 | −1 | 5 | 19 | 45 |
|  | A-1 | 0.15 | | | | | | | |
|  | BF-1 | 0.05 | | | | | | | |
| 40 | P-1 | 0.10 | −2 | −2.3 | −1.6 | 0.7 | 8 | 27 | 56 |
|  | A-1 | 0.15 | | | | | | | |
|  | BF-2 | 0.05 | | | | | | | |

Stabilisation of polyol

The oxidation resistance of the polyether polyol is determined by measuring the DSC value (differential scanning calorimetry, temperature-controlled calorimetry). To this purpose, 20 mg of the sample are weighed into an aluminium crucible and heated at a starting temperature of 50° C. and at a heating rate of 5° C./min. The start of the exothermic oxidation is determined calorimetrically by temperature-controlled measurement against an unstabilised reference substance. The temperature at which oxidation starts is indicated as well as the difference in temperature ($\Delta T$) between the temperature measured for each of the stabilised samples and the corresponding temperature of the unstabilised polyol. High values denote high oxidation resistance.

The results are summarised in Table 6 below (Examples 32–38).

TABLE 6

Oxidation resistance in accordance with the DSC method

| Ex. No. | % | Antioxidant | % | Antioxidant | % | Antioxidant | $T_{OX}$ (°C.) | ΔT |
|---|---|---|---|---|---|---|---|---|
| 32 | | control | | | | | 125 | — |
| 33 | 0.24 | BHT | 0.06 | A-1 | | | 172 | 47 |
| 34 | 0.24 | P-1 | 0.06 | A-1 | | | 177 | 52 |
| 35 | 0.24 | A-1 | 0.06 | BF-1 | | | 183 | 58 |
| 36 | 0.225 | A-1 | 0.075 | BF-1 | | | 184 | 59 |
| 37 | 0.10 | P-1 | 0.15 | A-1 | 0.05 | BF-1 | 184 | 59 |
| 38 | 0.05 | P-1 | 0.20 | A-1 | 0.05 | BF-1 | 183 | 58 |

What is claimed is:

1. A composition, which contains components A), B), C) and D); or components A), B) and C); or components A), B) and D), which comprises A) a polyether polyol or a mixture of such polyols, B) at least one benzofuranone derivative of formula I

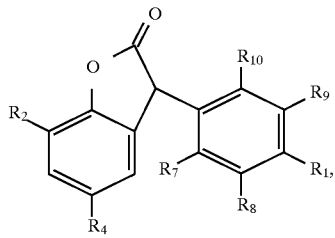

wherein either two of $R_1$, $R_7$, $R_8$, $R_9$ and $R_{10}$ are each independently of the other $C_1$–$C_4$alkyl, the others being hydrogen, or $R_7$ to $R_{10}$ are hydrogen, or at most two of these radicals are each independently of the other methyl, and $R_1$ is —O—CHR$_3$—CHR$_5$—O—CO—R$_6$, $R_2$ and $R_4$ are each independently of the other hydrogen or $C_1$–$C_6$alkyl, $R_3$ is hydrogen or $C_1$–$C_4$alkyl, $R_5$ is hydrogen, phenyl or $C_1$–$C_6$alkyl, and $R_6$ is $C_1$–$C_4$alkyl, C) at least one compound from the group of the phenolic antioxidants, and D) at least one compound from the group of the secondary amine antioxidants.

2. A composition according to claim 1, wherein in component B)

$R_1$ is hydrogen, $C_1$–$C_4$alkyl or —O—CHR$_3$—CHR$_5$—O—CO—R$_6$.

3. A composition according to claim 1, wherein in component B)

$R_7$, $R_8$, $R_9$ and $R_{10}$ are each independently of one another hydrogen or methyl.

4. A composition according to claim 2, wherein in component B)

$R_1$ is O—CH$_2$CH$_2$—O—CO—CH$_3$.

5. A composition according to claim 2, wherein in component B)

two of $R_1$ and $R_7$ to $R_{10}$ are methyl, the others being hydrogen.

6. A composition according to claim 1, wherein in component B)

$R_2$ and $R_4$ are tert-butyl.

7. A composition according to claim 1, wherein component C) is one or more than one compound of formula II

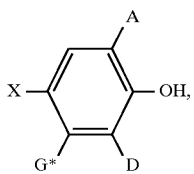

wherein

A is hydrogen, $C_1$–$C_{24}$alkyl, $C_5$–$C_{12}$cycloalkyl, phenyl-$C_1$–$C_4$alkyl, phenyl or a group of formula —CH$_2$—S—R$_{12}$ or

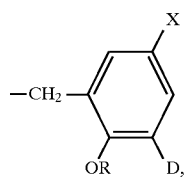

D is hydrogen, $C_1$–$C_{24}$alkyl, $C_5$–$C_{12}$cycloalkyl, phenyl-$C_1$–$C_4$alkyl, phenyl or a —CH$_2$—S—R$_{12}$ group, X is hydrogen, $C_1$–$C_{18}$alkyl or one of the groups of formula —C$_a$H$_{2a}$—S$_q$—R$_{13}$, —C$_b$H$_{2b}$—CO—OR$_{14}$, —C$_b$H$_{2b}$—CO—N(R$_{16}$)(R$_{17}$), —CH$_2$N(R$_{21}$)(R$_{22}$),

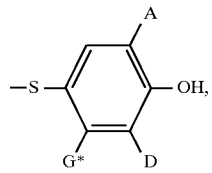

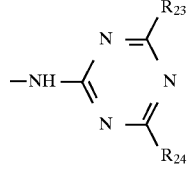

or 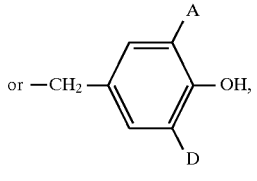

R is hydrogen or a group of formula —CO—CH=CH$_2$,

G* is hydrogen or $C_1$–$C_{12}$alkyl, $R_{12}$ is $C_1$–$C_{18}$alkyl, phenyl or a group of formula —($CH_2$)$_c$—CO—$OR_{15}$ or —$CH_2CH_2OR_{20}$, $R_{13}$ is hydrogen, $C_1$–$C_{18}$alkyl, phenyl, benzyl or a group of formula

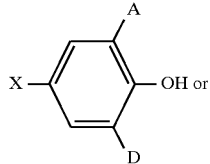

or

—($CH_2$)$_c$—CO—$OR_{15}$ or —$CH_2$—$CH_2$—$OR_{20}$, $R_{14}$ is $C_1$–$C_{30}$alkyl or one of the groups of formulae —$CHR_{18}$—$CH_2$—S—$R_{19}$,

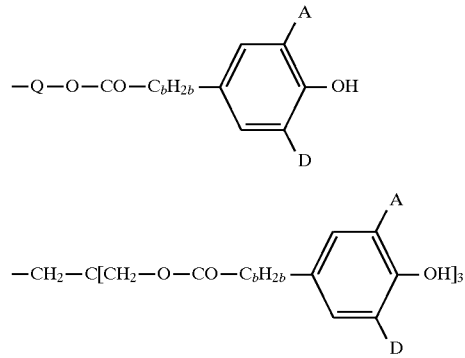

wherein

Q is $C_2$–$C_8$alkylene, $C_4$–$C_6$thiaalkylene or a —$CH_2CH_2$($OCH_2CH_2$)$_d$— group, $R_{15}$ is $C_1$–$C_{24}$alkyl, $R_{16}$ is hydrogen, $C_1$–$C_{18}$alkyl or cyclohexyl, $R_{17}$ is $C_1$–$C_{18}$alkyl, cyclohexyl, phenyl, $C_1$–$C_{18}$alkyl-substituted phenyl or one of the groups of formulae

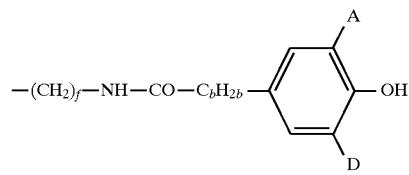

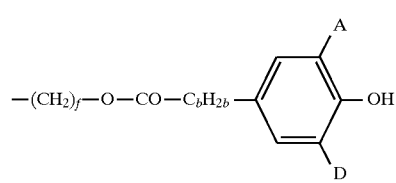

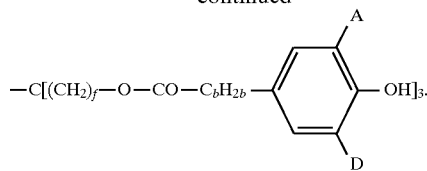

or $R_{16}$ and $R_{17}$ together are $C_4$–$C_8$alkylene which can be interrupted by —O— or —NH—, $R_{18}$ is hydrogen, $C_1$–$C_4$alkyl or phenyl, $R_{19}$ is $C_1$–$C_{18}$alkyl, $R_{20}$ is hydrogen, $C_1$–$C_{24}$alkyl, phenyl, $C_2$–$C_{18}$alkanoyl or benzoyl, $R_{21}$ is $C_1$–$C_{18}$alkyl, cyclohexyl, phenyl, $C_1$–$C_{18}$alkyl-substituted phenyl or a

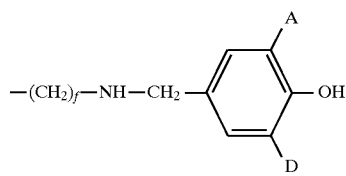

group, $R_{22}$ is hydrogen, $C_1$–$C_{18}$alkyl, cyclohexyl, or a

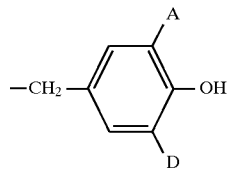

group, or $R_{21}$ and $R_{22}$ together are $C_4$–$C_8$alkylene which can be interrupted by —O— or —NH—, $R_{23}$ and $R_{24}$ are —S—$C_1$–$C_{18}$alkyl, a is 0, 1, 2 or 3, b is 0, 1, 2 or 3, c is 1 or 2, d is 1 to 5, f is 2 to 8, and q is 1, 2, 3 and 4.

8. A composition according to claim 7, wherein

A is hydrogen, $C_1$–$C_{18}$alkyl, cyclohexyl, phenyl or a group of formula —$CH_2$—$R_{23}$ or

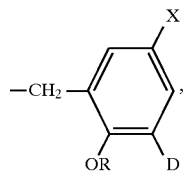

D is hydrogen $C_1$–$C_8$alkyl, cyclohexyl, phenyl or a —$CH_2$—$R_{24}$ group,

X is hydrogen, $C_1$–$C_8$alkyl or one of the groups of formula —$C_aH_{2a}$—$S_q$—$R_{13}$, —$C_bH_{2b}$—CO—$OR_{14}$, —$CH_2N(R_{21})(R_{22})$,

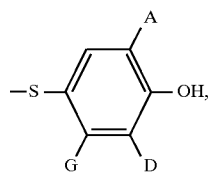

-continued

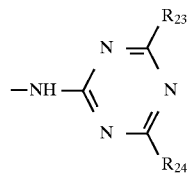

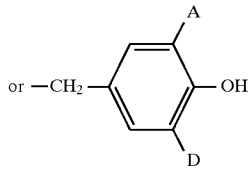

$R_{13}$ is $C_1$–$C_{12}$alkyl, phenyl or a —$(CH_2)_c$—CO—$OR_{15}$ group, $R_{14}$ is $C_1$–$C_{18}$alkyl or a

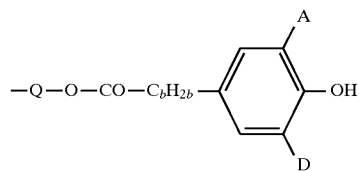

group, wherein Q is $C_2$–$C_8$alkylene, —$CH_2$—$CH_2$—S—$CH_2CH_2$ or a —$CH_2CH_2(OCH_2CH_2)_d$— group, $R_{15}$ is $C_1$–$C_{18}$alkyl, $R_{21}$ and $R_{22}$ are each independently of the other hydrogen or $C_1$–$C_{12}$alkyl, or $R_{21}$ and $R_{22}$ together are $C_4$–$C_8$alkylene which can be interrupted by —O— or —NH—, a is 1 or 2, b is 1 or 2, c is 1 or 2, and d is 1, 2 or 3, and $R_{23}$ and $R_{24}$ are —S—$C_1$–$C_{18}$alkyl.

9. A composition according to claim 8, wherein

A is hydrogen, $C_1$–$C_6$alkyl, —$CH_2$—$R_{23}$ or a

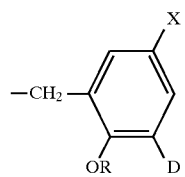

group,

D is hydrogen or $C_1$–$C_8$alkyl, and

X is hydrogen, $C_1$–$C_4$alkyl, —$CH_2$—$R_{23}$ or a group of formula

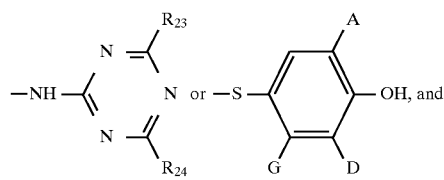

$R_{23}$ and $R_{24}$ are —S—$C_1$–$C_{18}$alkyl.

10. A composition according to claim 1, wherein component C) is a tocopherol or vitamin E, or an oligomeric antioxidant of the following formula

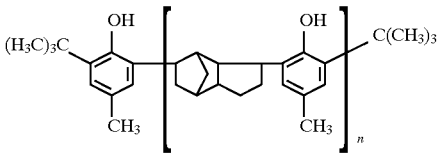

(average molecular weight: 600–700).

11. A composition according to claim 1, wherein component D) corresponds to formula III,

wherein $R_{25}$ is $C_1$–$C_{18}$alkyl, phenyl-$C_1$–$C_4$alkyl, $C_5$–$C_{12}$cycloalkyl, phenyl, naphthyl, or phenyl or naphthyl, each of which is substituted by $C_1$–$C_{12}$alkyl or $C_1$–$C_{12}$alkoxy or benzyl or α,α-dimethylbenzyl, $R_{26}$ is phenyl, naphthyl, or phenyl or naphthyl, each of which is substituted by $C_1$–$C_{12}$alkyl or $C_1$–$C_{12}$alkoxy or benzyl or α,α-dimethylbenzyl, or $R_{25}$ and $R_{26}$, taken together, form a radical of formula IV

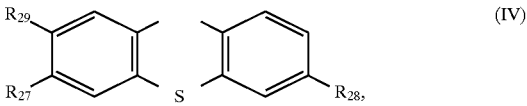

wherein $R_{27}$ and $R_{28}$ are hydrogen or $C_1$–$C_{18}$alkyl, or $R_{28}$ hydrogen or $C_1$–$C_{18}$alkyl, $R_{27}$ and $R_{29}$, taken together, form a group of formula

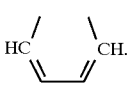

$R_{29}$ is hydrogen, or

12. A composition according to claim 11, wherein $R_{25}$ and $R_{26}$ are each independently of the other phenyl or $C_1$–$C_{12}$alkyl-substituted phenyl or, taken together, form a radical of formula IV.

13. A composition according to claim 11, wherein in formula III $R_{25}$ and $R_{26}$ form a radical of formula IV, wherein $R_{27}$ and $R_{28}$ are $C_6$–$C_{12}$alkyl, and $R_{29}$ is hydrogen, or component D) is a technical mixture obtained by the reaction of diphenylamine with diisobutylene, comprising a) diphenylamine;
b) 4-tert-butyldiphenylamine;
c) compounds of the group
 i) 4-tert-octyldiphenylamine,
 ii) 4,4'-di-tert-butyldiphenylamine,
 iii) 2,4,4'-tris-tert-butyldiphenylamine,
d) compounds of the group
 i) 4-tert-butyl-4'-tert-octyldiphenylamine,
 ii) o,o', m,m', or p,p'-di-tert-octyldiphenylamine,
 iii) 2,4-di-tert-butyl-4'-tert-octyldiphenylamine,
e) compounds of the group i) 4,4'-di-tert-octyldiphenylamine, ii) 2,4,-di-tert-octyl-4'-tert-butyldiphenylamine, and wherein not more than 5% of component a), 8 to 15% of component b), 24 to 32% of component c), 23 to 34%of component d) and 21 to 34% of component e) are present.

14. A process for the stabilisation of a polyether polyol, which comprises adding to said polyether polyol at least one compound of formula I according to claim 1 in combination with at least one compound from the group of the phenolic antioxidants and/or at least one compound of the group of the amino antioxidants of the secondary amine type.

15. A process for the preparation of a polyurethane, which comprises reacting a composition according to claim 1 with polyisocyanates.

16. A process according to claim 15, which process is carried out in the presence of a propellant for the preparation of a polyurethane foam.

17. Polyurethane, comprising the components B, C and D; B and C; or; B and D as defined in claim 1.

18. A composition according to claim 1, additionally comprising component E), an organic phosphite.

19. A composition according to claim 18, wherein the organic phosphite corresponds to formula

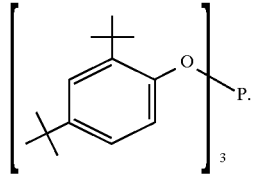

20. Polyurethane obtained according to the process of claim 15.

* * * * *